May 18, 1965     H. C. COOK     3,184,252

STABILIZER FOR TRACTOR LIFT ARMS

Filed May 29, 1963

Hosea C. Cook
INVENTOR.

BY

United States Patent Office 3,184,252
Patented May 18, 1965

---

3,184,252
STABILIZER FOR TRACTOR LIFT ARMS
Hosea C. Cook, Rte. 4, Box 192, Loris, S.C.
Filed May 29, 1963, Ser. No. 284,206
6 Claims. (Cl. 280—474)

The present invention is generally concerned with draft vehicles such as tractors, and is more particularly directed toward a stabilizer for tractor lift arms.

It is a primary object of the instant invention to provide a means for effecting a stabilization of a pair of tractor lift arms.

In conjunction with the above object, it is intended that the stabilizer of the instant invention in no way interfere with the lift arms.

Further, in addition to functioning as a stabilizing means for the lift arms, it is intended that the stabilizer also function as a means for attaching an implement to the tractor centrally aligned therewith in a manner which enables the ready substitution of one implement or drawn device for another.

Likewise, it is an object of the instant invention to provide a stabilizer which can be quickly and easily attached to a pair of tractor lift arms without requiring any modification whatsoever of the lift arms themselves.

In addition, it is an object of the present invention to provide a stabilizer which is relatively simple in construction, yet highly effective in rigidly stabilizing the lift arms.

In achieving the above objects, it is contemplated that the stabilizer of the instant invention consists basically of two units, each unit including an angular bar having the outer ends of both of the straight diverging legs secured at longitudinally spaced points along one of the lift bars with the apex ends of each of the bars being positioned approximately centrally between the lift bars and in approximately the same plane, these apex portions of the bars having interfitting plates interlocked by a locking pin.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
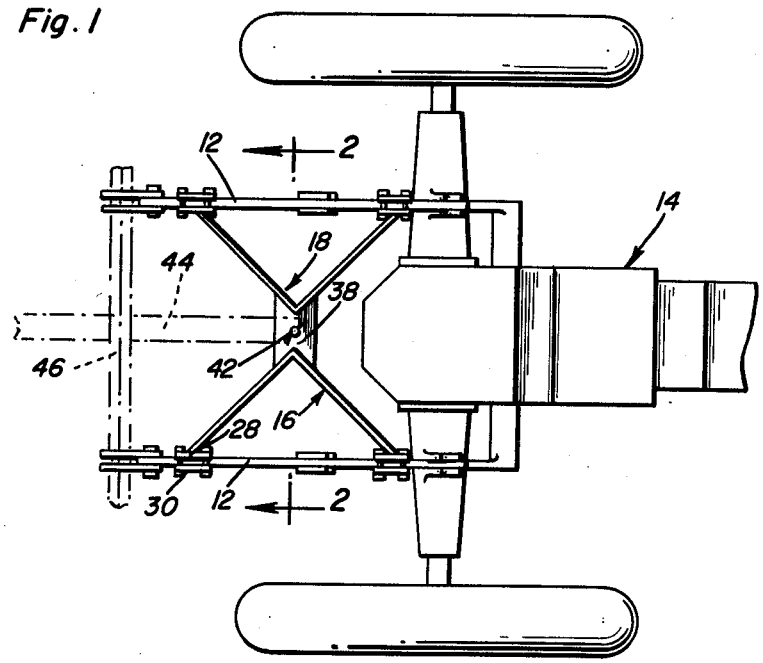
FIGURE 1 is a plan view of the rear portion of a tractor illustrating the lift arm with the stabilizer of the instant invention secured thereto.

Referring now more particularly to the drawings, the reference numeral 10 is used to generally designate the stabilizer comprising the instant invention. This stabilizer, as will be appreciated, from FIGURE 1, is to be secured between the conventionally provided lift arms 12 of a tractor 14.

The stabilizer 10 consists basically of two units 16 and 18. Each of these units 16 and 18 include a vertically orientated elongated angular rigid bar designated, in regard to the unit 16, by reference numeral 20, and in regard to the unit 18, by reference numeral 22.

Figure 2:
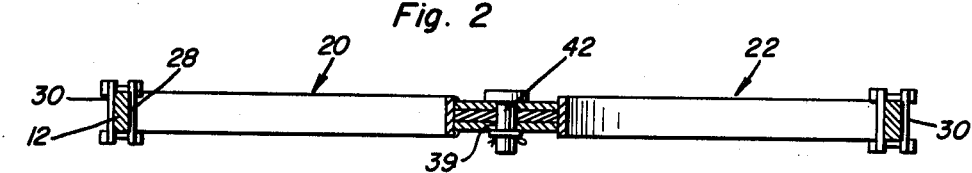
FIGURE 2 is an enlarged cross-sectional view taken substantially on a plane passing along line 2—2 in FIGURE 1.
Figure 3:
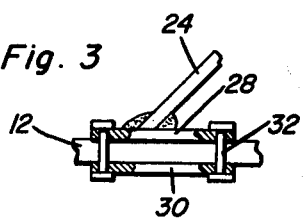
FIGURE 3 is an enlarged detailed view illustrating the manner in which the outer ends of the bars are to be attached to the lift arms.
Figure 4:
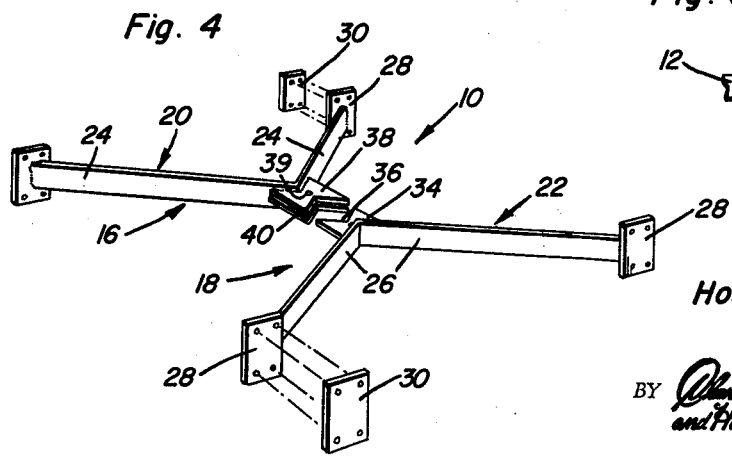
FIGURE 4 is an exploded perspective view of the stabilizer.

Each of the bars 20 and 22, have welded to the outer ends of the straight legs 24 and 26 thereof vertically orientated flat plates 28, these plates being of a height so as to project both above and below the corresponding lift arm 12 as illustrated in FIGURE 2. Associated with each plate 28 is a complementary plate 30 of a similar size and shape. The plates 28, when the units 16 and 18 are to be secured to the lift arms 12, are positioned against the inner faces of the lift arms 12 with the complementary plates 30 being positioned against the outer faces of the lift arm 12. Clamping bolts 32 are then extended through aligned apertures in the plates 28 and 30 located both above and below the upper and lower edges of the lift arms 12 so as to effectively clamp the lift arms 12 between the plates 28 and 30 without requiring an actual piercing or other modification of the lift arms 12. With reference to FIGURE 1, it will be noted that the angular relation between the legs 24 of the unit 16 and the legs 26 of the unit 18 is such so as to position the outer ends thereof a substantial distance apart and generally in the vicinity of the forward and rear ends of the corresponding lift arms 12.

In order to interconnect the units 16 and 18, the apex portion of the angular bar 22 has welded thereto an outwardly projecting flat plate 34 the outer end of which is formed or notched as at 36 so as to closely conform to the apex portion of the bar 20. The apex portion of the bar 20 is provided with a pair of parallel flat plates 38 welded thereto and projecting outwardly with the outer edges thereof also suitably formed or notched as at 40 so as to conform to the apex portion of the bar 22. As will be best appreciated from FIGURE 2, the space between the parallel plates 38 is such as to receive the plate 34 therebetween with a minimum clearance.

In order to interlock the units 16 and 18, transverse apertures 39 are provided through the plates 34 and 38, these apertures 39 aligning with each other upon a positioning of the plate 34 between the pair of plates 38 with the outer ends of the plates 34 and 38 contacting the apex portions of the opposite bars at which time an elongated locking pin 42 is inserted through the aligned apertures and suitably secured.

In addition to acting as a means for interlocking the units 16 and 18, the locking pin 42 also can be utilized to secure the tongues 44 of a towed device thus orientating the device directly in line with the center of the tractor so as to provide for a maximum control of the device. It will of course be appreciated that the stabilizer 10 in no way interferes with the attaching of a conventional drawbar 46 to the lifting arms, nor with the operation of the lifting arms.

From the foregoing, it will be appreciated that the stabilizer of the instant invention, while relatively simple in structure, provides an effective means for rigidifying the lift arms of a tractor in a manner which in no way interferes with the normal operation of the lift arms, and which, at the same time, provides a means for conveniently securing a towed device to the tractor so as to orientate the device in the best possible manner directly behind the tractor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stabilizer for a pair of spaced generally parallel tractor lift arms consisting of a pair of rigid units, each unit having two ends, said two ends being secured to a lift arm at longitudinally spaced points therealong, each unit formed so as to position an intermediate portion thereof, between the two ends, inwardly of the corresponding lift arm, the intermediate portions of both units being rigidly interlocked, each unit including an elongated angular bar, forming an angle when viewed in plan, the apex portion of which constitutes said intermediate portion, and connector means rigidly secured to and projecting outwardly from the apex portion of each bar and closely conforming to the apex portion of the other bar, and means releasably interlocking said connector means, said units being generally coplanar with the pair of lift arms.

2. The device of claim 1 wherein the connector means of one bar consists of a flat outwardly projecting plate, and the connector means on the other bar consists of a pair of flat outwardly projecting parallel plates spaced from each other a distance so as to allow for the reception therebetween of said one bar plate.

3. The device of claim 2 wherein each plate includes a transverse aperture therethrough, said apertures being alignable upon the reception of said one bar plate between the pair of plates, said releasable interlocking means consisting of an elongated locking pin received through the aligned apertures.

4. The device of claim 3 wherein each bar, on each end thereof, has an enlarged vertical plate rigid therewith, said plate projecting above and below the corresponding lift arm, a second plate of substantially the same size as said vertical plate positionable on the opposite side of the corresponding lift arm in alignment with said vertical plate, and a plurality of clamping bolts extending between said vertical plate and said second plate both above and below the lift arm.

5. A stabilizer for spaced arms consisting of a pair of units, said units each including a pair of straight angularly related rigid legs rigidly interconnected at one end and diverging therefrom, said legs being connectible at the other ends to said arms, one of said pair of legs having, at the interconnected ends, an outwardly projecting flat plate, said plate having its outer edge shaped so as to closely conform to the interconnected ends of the other pair of legs, said other pair of legs having, at the interconnected ends, an outwardly projecting pair of spaced parallel flat plates having the outer edges thereof shaped so as to closely conform to the interconnected ends of said one pair of legs, the space between said pair of plates being sufficient so as to receive said first mentioned plate, and means for releasably locking said first-mentioned plate in the space between said pair of plates.

6. The device of claim 5 wherein each plate includes a transverse aperture therethrough, said apertures being alignable upon the reception of said first-mentioned plate between the pair of plates, said means for releasably interlocking the plates consisting of an elongated locking pin received through the aligned apertures.

References Cited by the Examiner

UNITED STATES PATENTS

| 2,453,390 | 11/48 | Werner | 172—450 X |
| 2,692,148 | 10/54 | Bywater | 280—474 X |
| 2,783,058 | 2/57 | Skibbe | 280—474 |

FOREIGN PATENTS

| 888,868 | 2/62 | Great Britain. |
| 982,170 | 1/51 | France. |

A. HARRY LEVY, *Primary Examiner.*

LEO FRIAGLIA, *Examiner.*